US008412530B2

(12) United States Patent
Pereg et al.

(10) Patent No.: US 8,412,530 B2
(45) Date of Patent: Apr. 2, 2013

(54) METHOD AND APPARATUS FOR DETECTION OF SENTIMENT IN AUTOMATED TRANSCRIPTIONS

(75) Inventors: Oren Pereg, Amikam (IL); Tzach Ashkenazi, Petach-Tikva (IL)

(73) Assignee: Nice Systems Ltd., Raanana, IL (US)

( * ) Notice: Subject to any disclaimer, the term of this patent is extended or adjusted under 35 U.S.C. 154(b) by 463 days.

(21) Appl. No.: 12/709,482

(22) Filed: Feb. 21, 2010

(65) Prior Publication Data
US 2011/0208522 A1 Aug. 25, 2011

(51) Int. Cl.
*G10L 11/00* (2006.01)
(52) U.S. Cl. .................................... 704/270
(58) Field of Classification Search .............. None
See application file for complete search history.

(56) References Cited

U.S. PATENT DOCUMENTS

| | | | | |
|---|---|---|---|---|
| 5,918,222 | A * | 6/1999 | Fukui et al. ........................ 1/1 |
| 7,150,692 | B2 * | 12/2006 | Hong .......................... 473/561 |
| 7,225,122 | B2 * | 5/2007 | Shaw .............................. 704/9 |
| 7,280,964 | B2 * | 10/2007 | Wilson et al. ................. 704/251 |
| 7,340,393 | B2 * | 3/2008 | Mitsuyoshi ................... 704/207 |
| 7,874,983 | B2 * | 1/2011 | Zancho et al. ................ 600/300 |
| 7,912,720 | B1 * | 3/2011 | Hakkani-Tur et al. ........ 704/270 |
| 8,204,747 | B2 * | 6/2012 | Kato et al. .................... 704/254 |
| 8,214,214 | B2 * | 7/2012 | Bennett ........................ 704/254 |
| 2004/0147814 | A1 * | 7/2004 | Zancho et al. ................ 600/300 |
| 2006/0122834 | A1 * | 6/2006 | Bennett ........................ 704/256 |
| 2007/0143127 | A1 * | 6/2007 | Dodd et al. ........................ 705/1 |
| 2008/0177540 | A1 * | 7/2008 | Stewart et al. ................ 704/249 |
| 2008/0312920 | A1 * | 12/2008 | Liqin et al. .................... 704/235 |
| 2009/0248399 | A1 * | 10/2009 | Au ...................................... 704/9 |
| 2010/0063880 | A1 * | 3/2010 | Atsmon et al. ............. 705/14.53 |
| 2010/0121629 | A1 * | 5/2010 | Cohen .............................. 704/2 |
| 2010/0161315 | A1 * | 6/2010 | Melamed et al. ................. 704/9 |
| 2010/0332287 | A1 * | 12/2010 | Gates et al. ..................... 705/10 |
| 2011/0004473 | A1 * | 1/2011 | Laperdon et al. ............ 704/243 |
| 2011/0010173 | A1 * | 1/2011 | Scott et al. .................... 704/235 |
| 2011/0131144 | A1 * | 6/2011 | Ashour et al. ................ 705/319 |
| 2011/0207099 | A1 * | 8/2011 | Chen et al. .................... 434/236 |

* cited by examiner

*Primary Examiner* — Talivaldis Ivars Smits
(74) *Attorney, Agent, or Firm* — Soroker Agmon (57) ABSTRACT

A method for automatically detecting sentiments in an audio signal of an interaction held in a call center, including, receiving the audio signal from a logging and capturing unit. Performing audio analysis on the audio signal to obtain text spoken within the interaction. Segmenting the text into context units according to acoustic information acquired from the audio signal to identify units of speech bound by non-speech segments, wherein each context unit includes one or more words. Extracting a sentiment candidate context unit from the context units using a phonetic based search. Extracting linguistic features from the text of the sentiment candidate context unit and acoustic features from a segment of the audio signal associated with the sentiment candidate context unit. Determining in accordance with the linguistic features and acoustic features whether the sentiment candidate context unit is valid or erroneous, and determining sentiment polarity and intensity.

20 Claims, 5 Drawing Sheets

METHOD AND APPARATUS FOR DETECTION OF SENTIMENT IN AUTOMATED TRANSCRIPTIONS

TECHNICAL FIELD

The present disclosure relates to interaction analysis in general, and to detection of sentiment in automated transcriptions, in particular.

BACKGROUND

Large organizations, such as commercial organizations, financial organizations or public safety organizations conduct numerous interactions with customers, users, suppliers or other persons on a daily basis. Many of these interactions are vocal, or at least comprise a vocal component, such as an audio part of a video or face-to-face interaction. These interactions can contain various levels of sentiment expressed by either the customer or the agent. Sentiment can be positive, such as happiness, satisfaction, contentment, amusement, or other positive feelings of the speaker, or negative, such as anger, disappointment, resentment, irritation, or other negative feelings.

Detecting interactions that contain sentiment can produce high value to an organization. For example, a customer retention representative or a supervisor can initiate a return call to a customer whose call contained negative sentiments in order to improve customer satisfaction.

In current systems, due to the low percentage of calls containing sentiment out of all calls handled in a contact center, detection of such calls is a labor-intensive task, and one must hear a large amount of calls in order to encounter enough relevant interactions.

There is thus a need in the art for a system and method that can detect interactions having sentiment with high accuracy.

SUMMARY

A method and apparatus for automatically detecting sentiments in an audio signal, by classifying feature vectors extracted from the signal using predetermined models.

A first aspect of the disclosure relates to a method for automatically detecting sentiments in an audio signal of an interaction held in a call center, comprising: receiving the audio signal from a logging and capturing unit associated with the call center; performing, audio analysis on the audio signal to obtain text spoken within the interaction; segmenting the text into context units; extracting a sentiment candidate context unit from the context units; extracting features from the sentiment candidate context unit or from the audio signal; determining in accordance with the features whether the sentiment candidate context unit is valid or erroneous; and determining sentiment polarity and intensity for the sentiment candidate context unit. The method can further comprise determining a total interaction score indicating sentiment polarity and intensity of the interaction. Within the method, determining the total interaction score is optionally performed using an interaction sentiment model. Within the method, the audio analysis optionally comprises activating an engine selected from the group consisting of: a speech to text engine; a word spotting engine; an emotion detection engine; and a talkover engine. Within the method, determining whether the candidate context unit is valid or erroneous is optionally performed using a validity model. Within the method; determining the sentiment polarity and intensity is optionally performed using a sentiment polarity and intensity model. Within the method, the feature is optionally selected from the group consisting of: a term in the sentiment candidate context unit; a feature associated with the term; number of adjectives in the sentiment candidate context unit; number of adverbs in the sentiment candidate context unit; whether the sentiment candidate context unit contains a modal or a pronoun; speech rate in the sentiment candidate context unit; silence average duration in the sentiment candidate context unit; duration of the sentiment candidate context unit; main speaker in the sentiment candidate context unit; number of positive or negative dictionary terms in the sentiment candidate context unit; whether the term is an exact match with a dictionary term or not; a score indicating a level of match between the term and the dictionary term; score based on terms found in the sentiment candidate context unit; interaction duration; repetitions within the interaction of a term related to a word in the sentiment candidate context unit; part of speech of a word within the sentiment candidate context unit; a score obtained from a second audio analysis engine operated on the interaction or part thereof; a feature of a context unit neighboring the sentiment candidate context unit; a position of a context unit; and a relative position of a context unit. The method can further comprise a training step for generating the validity model. Within the method, the training step optionally comprises; receiving a training interaction; performing audio analysis on the training interaction for obtaining text; segmenting the text into context units; extracting a training sentiment candidate context unit from the context units; extracting features from the training sentiment candidate context unit or from the audio signal; receiving tagging data for the training sentiment candidate context unit; and generating a model using the training sentiment candidate context unit and the tagging data. The method can further comprise a training step for generating the polarity or intensity model. Within the method, the training step optionally comprises; receiving a training interaction; performing audio analysis on the training interaction for obtaining text; segmenting the text into context units; extracting a training sentiment candidate context unit from the context units; extracting features from the training sentiment candidate context unit and from the audio signal; receiving tagging data for the training sentiment candidate context unit; and generating the polarity or intensity model using the training sentiment candidate context unit and the tagging data. The method can further comprise a training step for generating the interaction sentiment model. Within the method, the training step comprises: receiving a training interaction; performing audio analysis on the training interaction for obtaining; segmenting the text into context units; determining sentiment context units from the context units; extracting features related to the interaction; receiving tagging data related to the interaction; and generating the interaction sentiment model using the features and the tagging data. The method of claim can further comprise a step of further analysis, selected from the group consisting of: topic extraction, link analysis, and root cause analysis.

Another aspect of the disclosure relates to an apparatus for automatically detecting sentiments in an audio signal of an interaction held in a call center, comprising: an interaction receiving component arranged to receive an audio signal representing the interaction; a context unit segmentation component arranged to segment the audio signal; a sentiment candidate identification component for identifying sentiment candidate from the context units; a feature extraction component arranged to extract at least text from a part of the audio signal associated with the sentiment candidates; and a classification component arranged to apply a model to the feature vector to determine whether the audio signal contains sentiment, or sentiment polarity and intensity within the audio signal. The apparatus can further comprise a natural language processing component arranged to perform linguistic analysis on text extracted by the extraction component. Within the apparatus, the extraction component optionally comprises one or more engines selected from the group consisting of: a speech to text engine, a word spotting engine; an emotion detection engine; and a talkover engine. The apparatus can further comprise a model training component arranged to train the model. Within the apparatus, the feature extraction component is arranged to extract one or more features selected from the group consisting of: a term; a feature associated with the term; number of adjectives in a context unit; number of adverbs in a context unit; whether the context unit contains a modal or a pronoun; speech rate in context unit; silence average duration in the context unit; duration of the context unit; main speaker in the context unit; number of positive or negative dictionary terms in the context unit; whether the term is an exact match with a dictionary term or not; a score indicating a level of match between the term and the dictionary term; score based on terms found in the context unit; interaction duration; repetitions within the interaction of a term related to a word in the context unit; part of speech of a word within the context unit; a score obtained from a second audio analysis engine operated on the interaction or part thereof; a feature of a second context unit neighboring the context unit; a position of a context unit; and a relative position of a context unit.

Yet another aspect of the disclosure relates to a computer readable storage medium containing a set of instructions for a general purpose computer, the set of instructions comprising: receiving an audio signal of an interaction held in a call is center from a logging and capturing unit associated with the call center; performing audio analysis on the audio signal to obtain text spoken within the interaction; segmenting the text into context units; extracting a sentiment candidate context unit from the context units; extracting features from the sentiment candidate context unit and from the audio signal; determining in accordance with the features whether the sentiment candidate context unit is valid or erroneous; and determining sentiment polarity and intensity fro the sentiment candidate context unit.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The present invention overcomes the disadvantages of the prior art by providing a novel method and a system for automatically detecting sentiment in interactions containing a vocal part, such as interaction captured in a contact center or another interaction-rich environment, which handles significant volumes of interactions such as customer interactions.

In some embodiments, in order to locate sentiments, words are extracted from the interaction, for example by fully or partially, automatically or manually transcribing the interactions, spotting words belonging to a predetermined word collection within the interaction, or the like. Context units that contain words that indicate sentiment are indicated as candidates.

For each such candidate, features are extracted, and compared against a model indicating whether the candidate is valid, i.e., whether it indeed contains sentiment, and if it does, what are the polarity (i.e., positive or negative) and intensity of the sentiment.

Then a higher level model is used, determining based on the context units within an interaction that are determined to be sentimental, a total probability that the interaction as a whole comprises sentiment, for example by a computational method or by comparing to yet another model.

The models, including a model for determining whether the decision that the context unit is sentimental is valid or erroneous, a sentiment classification model, and optionally a model for evaluating the overall probability that an interaction contain sentiment, are estimated based on training interactions and manual tagging. The models are then used for evaluating further interactions, referred to as runtime or testing interactions.

Figure 1:
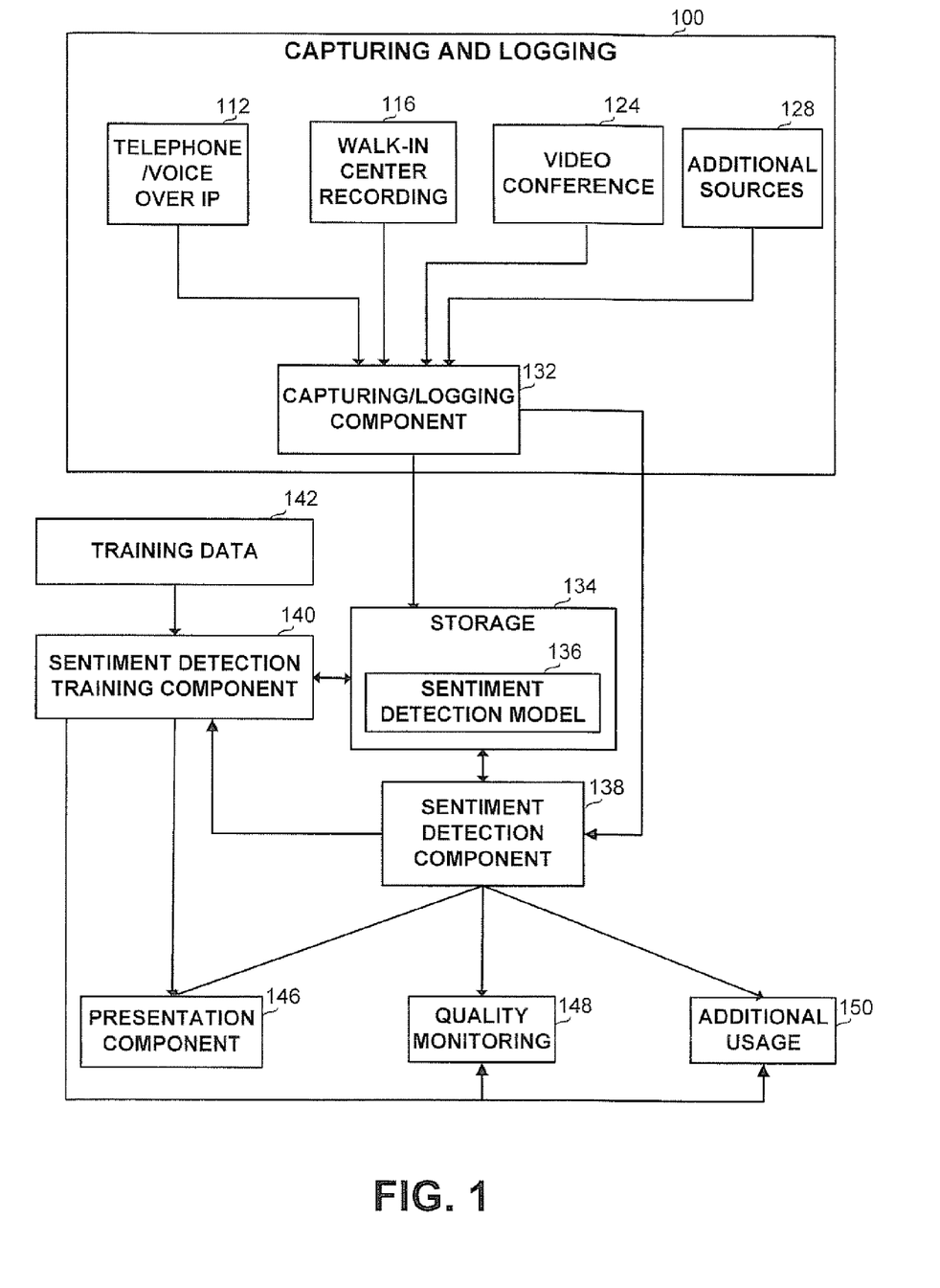
FIG. 1 is a block diagram of the main components in a typical environment in which the disclosed method and apparatus are used.

Referring now to FIG. 1, showing a block diagram of the main components in a typical environment in which the disclosed method and apparatus are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like. The interactions are captured using capturing or logging components 100. The vocal interactions usually include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two-sided conversations. The interactions can further include face-to-face interactions, such as those recorded in a walk-in-center 116, video conferences 124 which comprise an audio component, and additional sources of data 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others.

Data from all the above-mentioned sources and others is captured and preferably logged by capturing/logging component 132. Capturing/logging component 132 comprises a computing platform executing one or more computer applications as detailed below. The captured data is optionally stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be is located onsite where the segments or some of them are captured, or in a remote location. The capturing or the storage components can serve one or more sites of a multi-site organization. A part of, or storage additional to storage 134 is storage 136 that stores sentiment extraction models which are determined via training as detailed below, and used in run-time for detecting sentiment in further interactions. Storage 134 can comprise a single storage device or a combination of multiple devices. Sentiment detection component 138 detects sentiments within interactions, i.e., indicates whether an interaction contains sentiment (positive or negative) and at what polarity and level. In addition, sentiment extraction component 138 may also indicate or return the semimetal sections in the interactions. The apparatus further comprises sentiment detection training component 140 for training models upon training data 142.

The output of sentiment extraction component 138 and optionally additional data are preferably sent to presentation component 146 for presentation in any way the user prefers, including for example various graphic representations, textual presentation, table presentation, vocal representation, or the like, and can be transferred in any required method, including showing on a display device, sending a report, or others. The output can also be presented as a dedicated user interface that provides the ability to examine and listen to the areas or interactions containing sentiment. The results can further be transferred to or analyzed by a quality monitoring component 148, for monitoring the performance of an agent, an agent group, interactions belonging to a particular category, or the like. The results are optionally transferred also to additional usage components 150, if required. Such components may include categorization components that can use the sentiment data as categorization criteria. For instance, the categorization criteria can filter interactions containing negative sentiment exceeding a certain level, filter interactions with positive sentiment, or the like. Additional usage components may also include further analysis, for example performing root cause analysis only on sentimental areas of interactions. Additional usage components may also include playback components, report generation components, alert generation components, or others. The sentiment results can be further fed back and change the sentiment extraction model generated by sentiment detection training component 140.

The apparatus may comprise one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
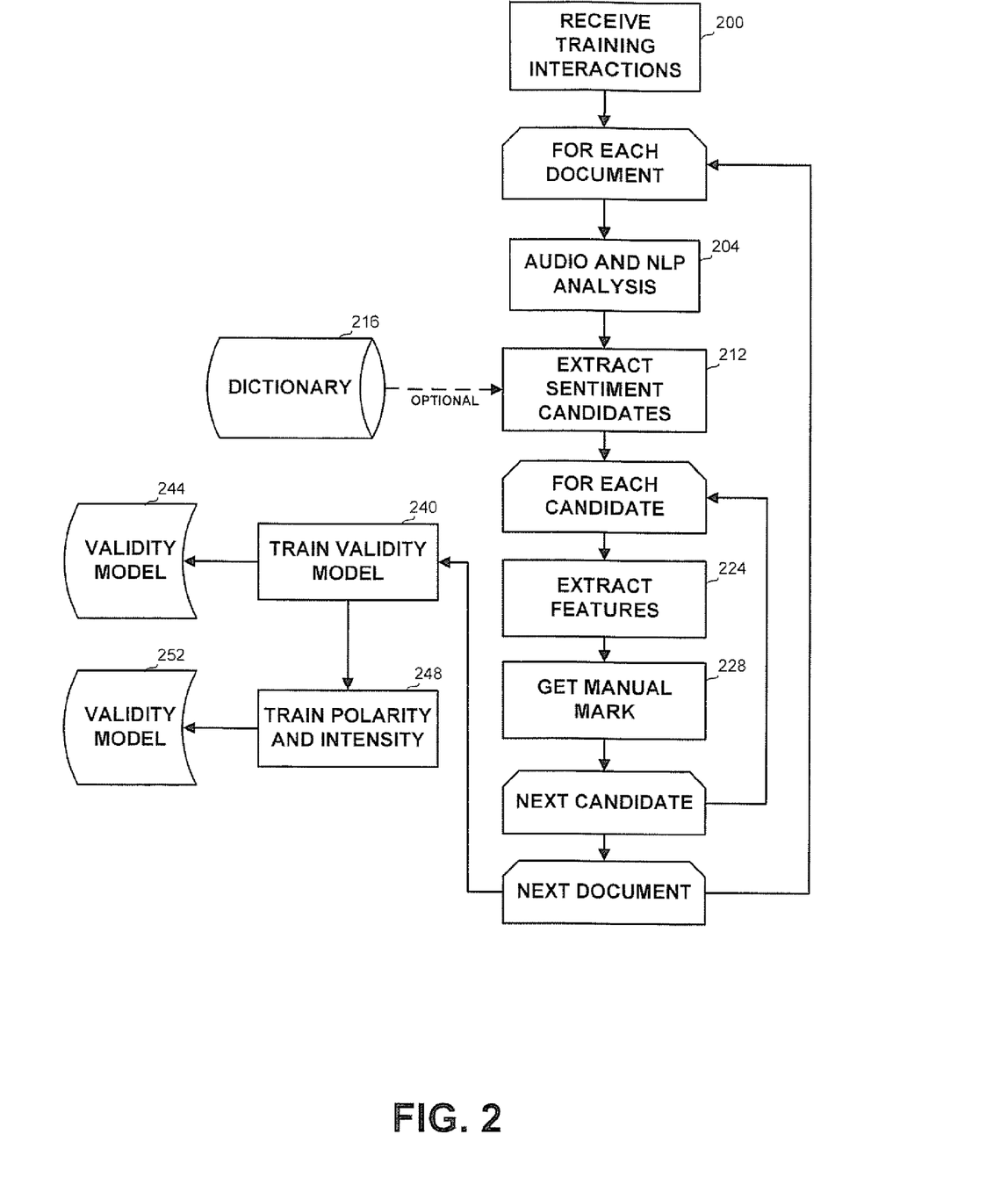
FIG. 2 is a flowchart of the main steps in a method for training sentiment models for context units, in accordance with the disclosure.
Figure 3:
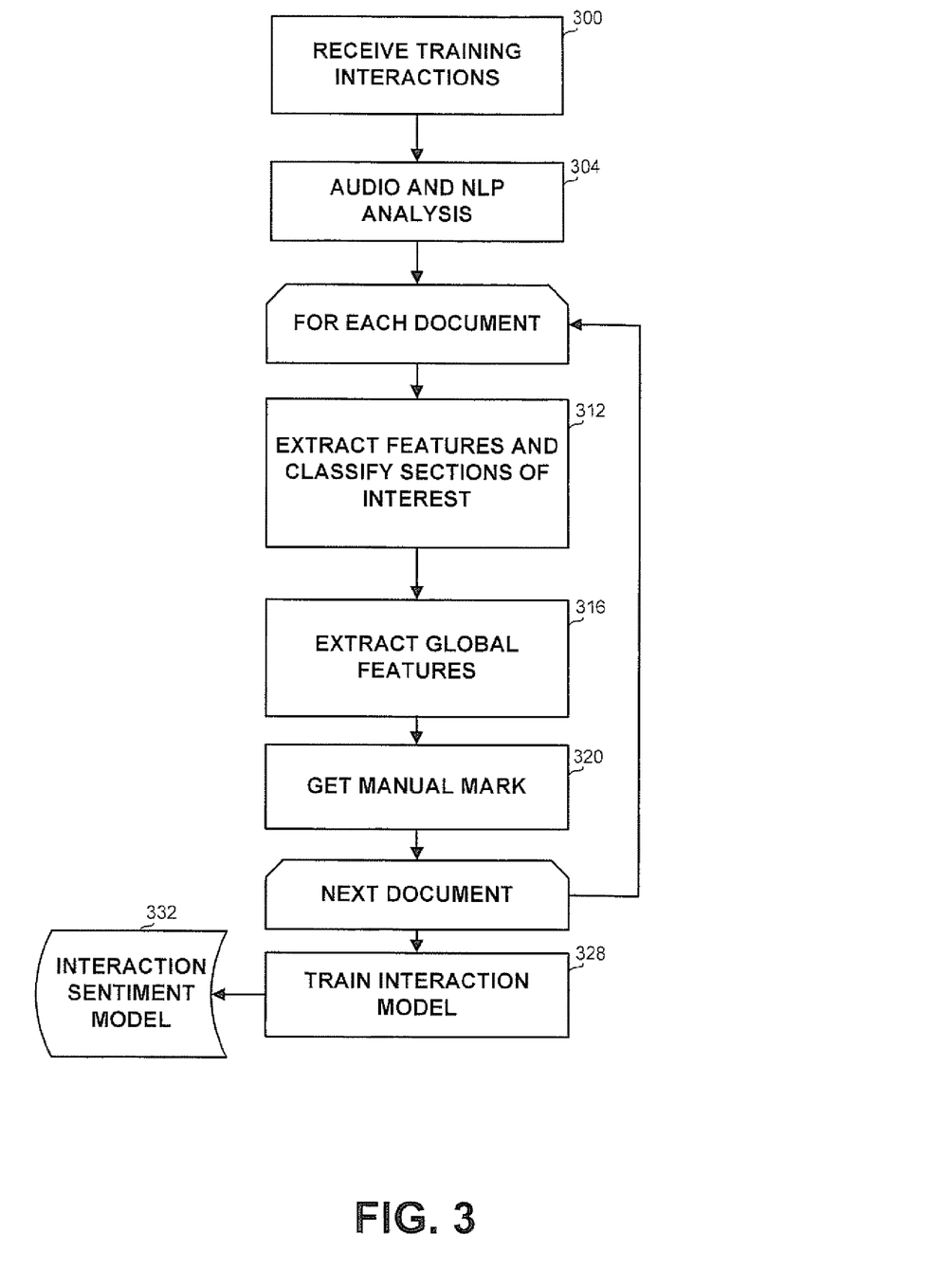
FIG. 3 is a flowchart of the main steps in a method for training an interaction level sentiment model, in accordance with the disclosure.

Referring now to FIG. 2 and FIG. 3 showing flowcharts of the main steps in methods for training sentiment detection models.

FIG. 2 is a flowchart showing the main steps in a method for training a model for detecting errors in sentiment detected within automatically extracted text, or a model for sentiment polarity classification.

In some embodiments, sentiment detection or extraction is performed per context unit, i.e., per a unit of speech which is bounded by non-speech segments, such as silence. A context unit typically contains one or more words.

The method is used for constructing a first model for classifying context to units detected to contain sentiments as valid or erroneous, and a second model for classifying context units determined to contain sentiment as positive or negative, and determining the sentiment level.

It will be appreciated that whenever the description below relates to an interaction, it is to be understood to relate to an audio signal that captured the whole or part of an interaction, such as a phone call, a video conference, or any other interaction comprising a vocal part.

On step 200, the training corpus comprising captured interactions is received. The documents contain vocal interactions or vocal parts of interactions captured or logged in the environment, and optionally relevant metadata, such as Computer Telephony Interaction (CTI) data, Customer Relationship Management (CRM) data, or the like. The training interactions should characterize as closely as possible the interactions regularly handled within the environment. When one set of models is to be used in multiple call centers, the model may be trained using interactions captured in multiple call centers, so that the model is not biased and represents all target call center environments.

The method then iterates over all or some of the documents in the training corpus.

On step 204, audio and Natural Language Processing (NLP) is performed, by activating relevant engines on one or more of the training interactions. The activated engines preferably include speech recognition engines, such as speech-to-text (S2T) or word spotting engines, or any other engine such as emotion detection engine, a call flow analysis engine, a talk analysis engine, or other tools for retrieval or extraction of data from interactions.

NLP Analysis includes linguistic analysis on the on text extracted from the interactions, including for example part of speech (POS) tagging and stemming, i.e., finding the base form of a word. The analysis can be performed using any proprietary, commercial, or third party tool.

The raw text extracted on audio and NLP analysis step 204 is optionally segmented into context units. As explained above, a context unit is generally identified as a sequence of words bounded by non-speech which is generally longer than the non-speech between two consecutive words. In order to identify the context units within the text, information acquired from the audio input of the interactions is used as well. The breaks between words can be received from the speech recognition engine, or obtained by an algorithm that measures the time difference between words. A predetermined limit of number of words belonging to one context unit can be applied, in order not to create too long context units if no long-enough time difference is detected between words. Another option for context unit segmentation can be arbitrary segmentation, for example by segmenting the interaction to non-overlapping sequences of X words each.

For each document, sentiment candidates are extracted on step 212, optionally based on dictionary 216, by associating words or word combinations with sentiment. Candidate extraction step 212 can also be preformed using fuzzy search methods such as phonetic based search. Metaphone algorithm or others, using such search highly raises system recall. Identifying the sentiment candidates optionally includes evaluating the probability of each context unit to contain sentiment, as well as the sentiment polarity (positive or negative. The dictionary can also associate senses (i.e., meaning) with the context units by requiring a specific part of speech, or by imposing other limitations on the text, for example limiting the term to be a base form. Additional heuristic requirements such as the existence of negation words or intensifying word (e.g. very, most) can also be imposed as part of extracting the sentiment candidates.

It will be appreciated that during subsequence updates or enhancements of the models, extracting the sentiment candidates can utilize models available at the relevant time. It will be appreciated that in some embodiments only candidates complying with a certain criteria, such as containing sentiment with probability exceeding a predetermined threshold, or those candidates having the highest probabilities are considered on further analysis as detailed below.

Step 224 comprises extracting a feature vector from each candidate extracted on step 212. The feature vector is later utilized with manual tagging to information in training the sentiment model.

The features can include any linguistic, acoustic, meta-data or any feature associated with the context unit as a whole, with the dictionary terms found in the context unit, with words of the context unit or with the whole interaction. In some embodiments, the features can include any one or more of the following features:

Terms, i.e., words or word combinations appearing in a list of words or terms that reflect sentiment (i.e., a sentiment dictionary);

Features associated with the terms discussed above, including the terms' polarity, intensity, part of speech, term length in words or phonemes, whether the term is preceded or followed by an adjective, an adverb, an intensifying word (e.g., very, slightly), or a negation word (e.g., not), whether the term is an exact match or not, a score corresponding to the level of match between the word and the transcribed text;

Number of adjectives in the context unit;

Number of adverbs in the context unit;

Whether the context unit contains any modals or pronouns;

Speech rate in the context unit, which may be measured in words per second or phonemes per second;

Silence average duration, i.e., the average duration of silence or non-speech between words in the context unit;

Duration of the context unit, which may be measured in words or seconds;

The main speaker in the context unit, e.g., whether it is the agent or the customer in a call center interaction;

The total number of positive and negative dictionary terms found in the context unit;

A score based on all terms found in the context unit;

The interaction duration;

One or more words or word combinations and their repetitions within the context unit;

Part of speech of one or more words within the context unit;

A score obtained from a different audio analysis engine, such as a probability score from a speech recognition engine for terms within the context unit, or an emotion probability for the relevant pat of the interaction;

Features of the neighboring, i.e., the preceding and following context units; the values of the features discussed above and below as related to the context units preceding and following the current context unit, even though these context units may not be identified as sentiment candidates;

Position features: such features are optionally applied to only the first or last predetermined number of context units within an interaction, such as but not limited to the first five or another predetermined number of context units, or the last five or another predetermined number context units within an interaction. The position features may include any one or more of the following:

Context unit position in terms of time or ordinal counter;

Context unit relative position, i.e., the position of a context unit in terms of percentage within the interaction.

At step 228, the candidate units are assigned tagging data. In some embodiments, the tagging data is assigned by a human listener, which listens to the context units indicated as sentimental on step 212 and assigns each candidate with one or more grades, indicating whether the automatically transcribed text in the context unit is erroneous, to what extent the candidate indeed contains sentiment, and what the sentiment polarity and intensity are. For example, for a particular interaction, the manual tagging can provide the following results: candidate 1: no sentiment (i.e., the candidate was erroneously indicated as containing sentiment): candidate 2: high negative sentiment: candidate 3: positive sentiment: candidate 4: erroneous transcription.

It will be appreciated that in some embodiments, the training interactions are accompanied by tagging, produced by a human listening to the call. In such embodiments, a human or an automated system will match each candidate context unit with the relevant part of the interaction, determine whether the part was to tagged as sentimental on step 212, and associate the correct polarity and intensity with each candidate. However, the first embodiment is more economical since it requires the human listener to listen only to those context units indicated by the system as sentimental.

At step 240, a validity model 244 is trained using pairs, wherein each pair relates to one context unit identified by the system as sentimental on step 212. Each pair consists of the feature vector related to the context unit as extracted on step 224, and an indication whether the context was marked as erroneously transcribed or not, as determined on step 228. Alternatively, the indication can relate to whether the context unit was correctly identified as containing sentiment. In some embodiments, some pairs relate to a context unit for which the tagging indicated the detected sentiment to be wrong.

At step 248, a polarity and intensity model 252 is trained using pairs, wherein each pair relates to one context unit and consists of features from the feature vector related to the context unit as extracted on step 224, and the sentiment polarity and intensity assigned to the context unit in accordance with the tagging information. It will be appreciated that the used features may consist of all or any subset of the features extracted on step 224. Polarity and intensity model 252 is optionally comprised of a different model for each of the polarity-intensity combination (e.g., negative-high, neutral, positive-low, or the like). Classification is then conducted by selecting of the highest scoring model.

A manual tag of "Error", indicating that the context unit should have not been indicated as sentimental is efficient in eliminating errors caused by speech to text errors. A manual tag indicating that the context unit is indeed sentimental is efficient in associating the context unit with the correct sentiment polarity and intensity.

Training is preferably performed using machine learning techniques such as neural networks, Support Vector Machines (SVM) or other methods. The output of training step is a sentiment model that will be used in production stage, also referred to as run-time or test stage, as discussed in association with FIG. 4 below. The model predicts whether a particular context unit contains sentiment, and if so, what are the polarity and intensity or level of the sentiment.

The model predicts according to a feature vector associated with a context unit whether there is sentiment in the context unit, and what are the sentiment polarity and intensity of the sentiment. It will thus be appreciated that the larger and more representative the training corpus, the more predictive is the trained model.

It will be appreciated that step 240 and step 248 can be performed together, and that validity model 244 and polarity and intensity model 252 can be implemented as a single model.

Referring now to FIG. 3, showing a flowchart of the main steps in a method for training an interaction level sentiment model. In some embodiments, this method uses the models trained in accordance with FIG. 2 above.

At step 300, training interactions are received, similarly to step 200 of FIG. 2 detailed above. The training interactions should characterize as much as possible the interactions expected to be analyzed by the apparatus and method in runtime.

At step 304, audio analysis and NLP analysis are performed in an analogous manner to step 204 of FIG. 2 above.

At step 312, the interaction is segmented into context units, and features are extracted for each context unit, which may relate to the audio, extracted text, or data extracted by other engines, as detailed in association with step 224 of FIG. 2 above.

Once the features are extracted, the model or models trained as detailed in association with FIG. 2 above are now used to determine candidates from the context units and to classify them, by activating the validity model and the polarity and intensity model on the feature vectors of the context units containing sentiment.

On step 316, a global feature vector is extracted, comprising features which relate to the global interaction level. The features can include any is linguistic, acoustic or meta-data feature associated with the interaction as a whole, with the dictionary terms found in the interaction, with the candidate context units contained in the interaction, or with the classification thereof. In some embodiments, the features can include any one or more of the following:

Total number of candidates marked as sentimental and positive;

Total number of candidates marked as sentimental and negative;

Any score based on a combination of the classification scores determined for context units;

Maximal score of positive scored context unit in the interaction;

Maximal score of negative scored context unit in the interaction;

Mean score of positive classified context units in the interaction;

Mean score of negative classified context units in the interaction;

Interaction duration;

Number or length of talkover events in the interaction; or

Prosody based emotion engine score for the interaction.

At step 320, manual tagging is received for the entire interaction, the tagging assigning the interaction into one of predefined sentiment classes, such as but not limited to 'Positive', 'Negative', 'High Positive', 'High Negative', or 'Neutral'. The tagging is received from a human listener that uses a suitable user interface, or from another system, to assign a tag for the interaction.

At step 328, an interaction sentiment model 332 is trained using pairs, wherein each pair relates to one interaction, and consists of the feature vectors related to the interaction as extracted at steps 312 and 316 detailed above, and the sentiment assigned to the interaction at step 320. Training is preferably performed using machine learning techniques such as neural networks. Support Vector Machines (SVM) or other methods. The output of training step is a hybrid sentiment model that will be used in production stage, also referred to as run-time or test stage, as discussed in association with FIG. 2 above. Interaction sentiment model 332 predicts the sentiment level to be associated with any given feature vectors. It will thus be appreciated that the larger and more representative the training corpus, the more predictive is the trained model.

It will be appreciated that the training methods described in FIG. 2 and FIG. 3 can use the same training interactions, or different training interactions. However, in some embodiments it is preferable to use different interactions, since using the same set may degrade the performance of the hybrid model.

Figure 4:
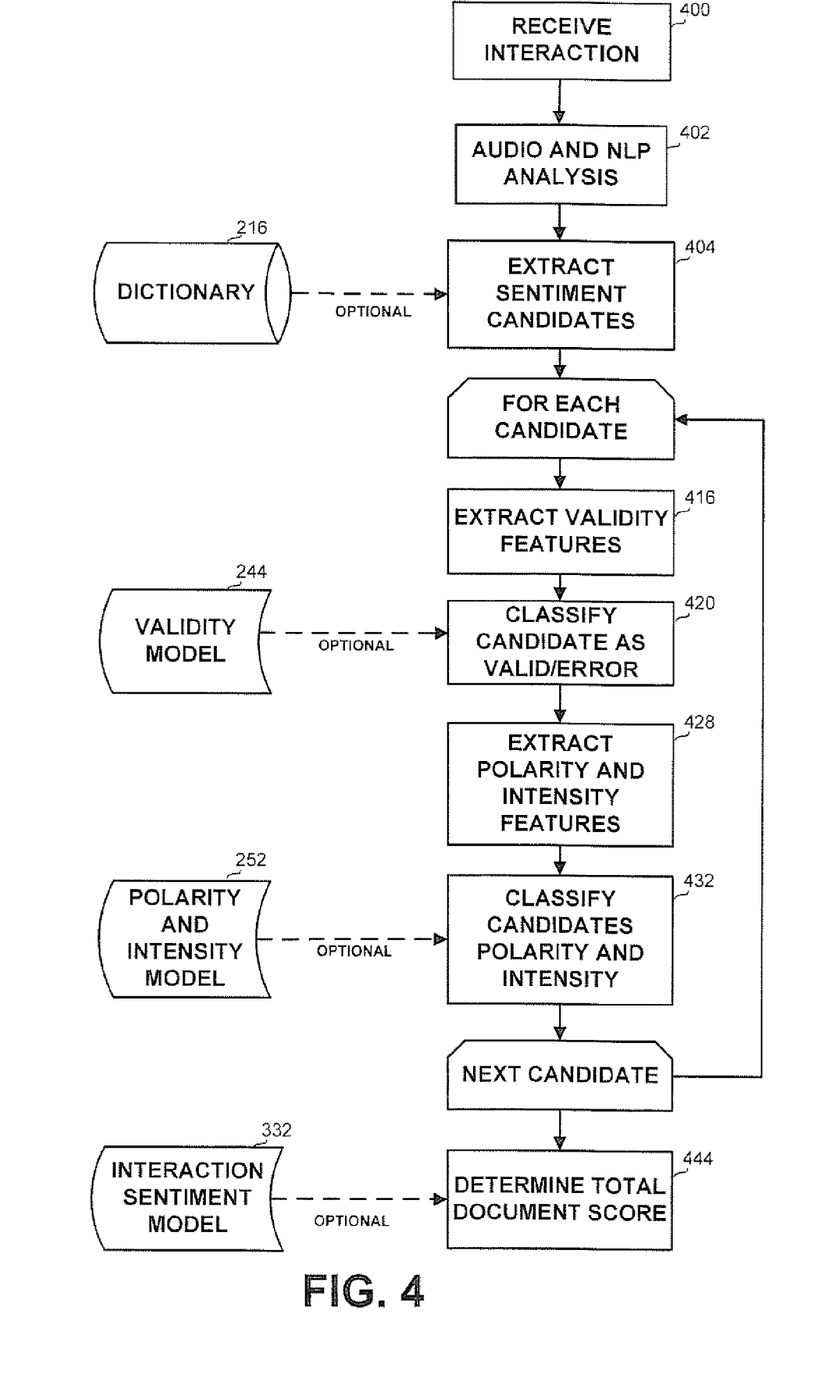
FIG. 4 is a flowchart of the main steps in a method for the detection of sentiment in an interaction, in accordance with the disclosure.

Referring now to FIG. 4, showing a flowchart of the main steps in a method for sentiment detection and classification.

While FIG. 2 and FIG. 3 above detailed the training phase, FIG. 4 describes the method of detecting sentiments in run-time, or testing environments, i.e., detecting sentiments in interactions for which no human tagging is available, and in which it is required to detect sentiments, for example for detecting positive or negative interactions in a call center.

On step 400 an interaction is received, for which it is required to detect whether it contains sentiment and of what polarity or intensity. The interaction may be captured in the same environment as the training interactions received on step 200 of FIG. 2 and step 300 of FIG. 3.

At step 402, the interaction undergoes audio and NLP analysis, similarly to step 204 of FIG. 2 above, in order to obtain text spoken within the interaction.

At step 404, the text is segmented into context units and sentiment candidates are extracted from the context units optionally using dictionary 216, as similarly to step 212 of FIG. 2 above.

At step 416, features related to assessing the validity of each candidate context unit are extracted, similarly to the features extracted at step 224 of FIG. 2. The features may include the features relevant to detecting whether the candidate is indeed associated with sentiment or not.

At step 420, the candidates are classified as valid or erroneous using validity model 244 trained at step 240 of FIG. 2.

At step 428, for those context units which were validated as sentimental, further features are extracted, which relate to the polarity and intensity of the sentiment exhibited in the context unit.

At step 432, the polarity and intensity of the sentiment of the candidates are determined according to polarity and intensity model 252, as trained on step 248 of FIG. 2 above.

It will be appreciated that validity feature extraction step 416 and polarity and intensity feature extraction step 428 can be performed jointly and similarly is for classification steps 420 and 432.

Once all candidate context units are processed, a total score indicating the sentiment level and polarity for the whole interaction is determined at step 444, using interaction sentiment model 332 as determined at step 328 of FIG. 3.

Optionally, a confidence score is assigned to the interaction, indicating a certainty indicator for the classification result.

In some embodiments, the sentiment extraction results can be fed back and used for enhancing the validity model, the polarity and intensity model and the interaction model generated by the methods of FIG. 2 and FIG. 3 above.

The sentiment extraction results may also be transferred to further processing, which may include, for example, performing statistics, presenting the results, comparing different agents or different categories, or the like, as described in association with FIG. 1 above. The processing can also include analysis such as topic extraction, root cause analysis or link analysis. Topic extraction relates to automatically or manually compiling a list of key-phrases that represent, are extracted from, or are otherwise associated with a category or to major topics of a category, the environment, an associated person, or a particular subject or entity within the organization. Each key-phrase comprises one or more words or terms. Then relations between the key-phrases, such as "appearing together", "appearing after one another" or the like, can enhance the understanding of a category. Root cause analysis relates to analysis aimed at revealing the reason or the cause for a problem or an event exhibited in one or inure interactions. Link analysis is a process that finds related concepts by extracting phrases that have a high co-appearance frequency within one or more analyzed phrases, paragraphs or other parts of an interaction.

The sentiment extraction results may also be used as part of or as a trigger for quality monitoring in which the quality or performance of an agent or a quality parameter of a product or service is evaluated, using an automated system having a suitable user interface.

It will be appreciated that it is possible to further analyze only certain is sentiment levels. For example, when evaluating performance of an agent, only highly positive or highly negative sentiment may be important, while for the customer side, even lower sentiment levels may be important.

Figure 5:
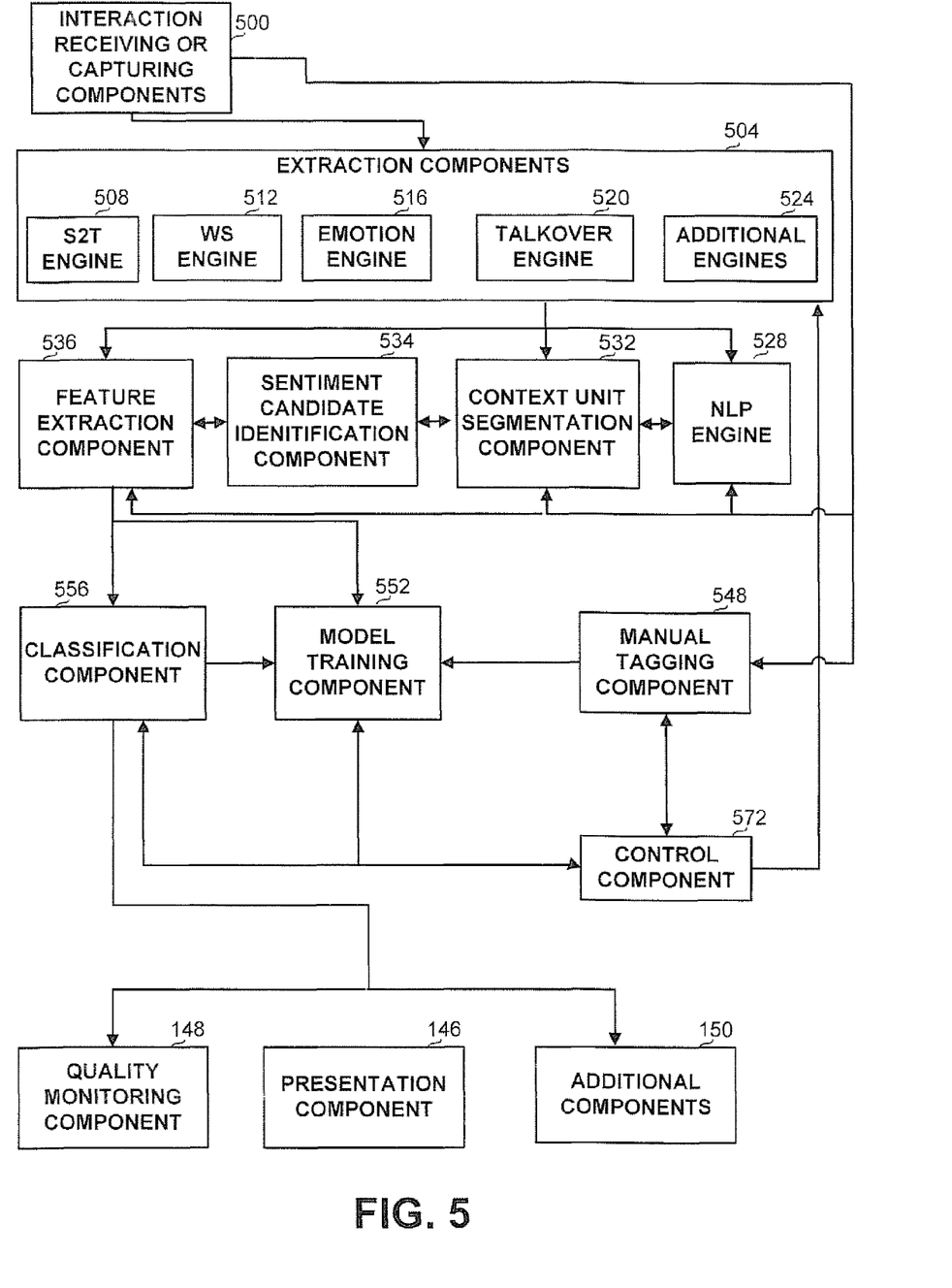
FIG. 5 is a block diagram of the main components in an apparatus for detecting sentiment in interaction, in accordance with the disclosure.

Referring now to FIG. 5, showing a block diagram of the main components in an apparatus for detecting sentiment in interactions. The apparatus implements sentiment detection component 138 and sentiment detection training component 140 of FIG. 1, which have multiple common components. The components of the apparatus are thus preferably software units such as modules, executables, libraries or the like.

The apparatus comprises interaction receiving or capturing components 500, arranged to capture or receive interactions from a storage device or from another source. The interactions include training interactions during the training of the apparatus, and run-time interactions which are to be analyzed in run-time.

The apparatus further comprises extraction components 504, arranged to extract data and metadata from the interactions, and in particular from their audio part. Extraction components 504 optionally comprise speech to text engine 508 arranged to transcribe audio and output as accurate as possible transcription of the audio signal; word spotting (WS) engine 512 designed to spot words out of a pre-compiled list in an audio signal; emotion detection engine 516 arranged to identify areas within an audio signal containing positive or negative emotions; talkover engine 520 arranged to identify silence areas, talkover areas, areas in which the agent or the customer speaks, areas in which the agent or the customer barge into the other person's speech, or the like; and additional engines 524 designed to extract additional information related to the interaction, such as number and timing of holds, transfers, or any other information.

The apparatus further comprises NLP engine 528 for performing NLP analysis on text extracted from the interactions, for example by S2T engine 508 or WS engine 512. The NLP optionally comprises POS tagging, stemming of words, stop words removal, or other processing.

Yet other components are context unit segmentation component 532, sentiment candidate identification component 534, and feature vector determination component 536. Context unit segmentation component 532 is designed to split an interaction into context units, based on the non-speech between context units which is generally assumed to be longer than the non-speech between words within the same context unit. Sentiment candidate identification component 534 identifies context units which are candidates for containing sentiment.

Feature vector determination component 536 is designed to extract features and generate a feature vector for each context unit, including features such as those detailed on association with FIG. 2 and FIG. 3 above. Alternatively, feature vector determination component 536 extracts features only from the context units identified by Sentiment candidate identification component 534 as candidates for containing sentiment. Feature vector determination component 536 may receive and use the output of extraction components 504 or of NLP engine 528, as well as an audio signal or a part thereof.

The apparatus optionally comprises manual tagging component 548 for manually tagging context units as being sentimental or not, and what is the polarity and intensity of the sentiment, if any. Model training component 552 is arranged to receive pairs of feature vectors and tags, and generate a sentiment validity model, a sentiment polarity and intensity model, or an interaction model, to be used by classification component 556. Classification component 556 classifies the context units as sentimental or not, and determines the polarity and intensity of the sentimental context units, based on feature vectors representing the context units.

Manual tagging component 548 and model training component 552 are optional, as the models can alternatively be received from an external source. For example, in a call center having multiple branches, it is possible to train models once, and distribute them to all branches. Alternatively, a model is trained in a lab based on a representative sample of interactions from multiple call centers and distributed to the call center sites.

Management component 572 is arranged to activate the various engines and components, and control the data transfer and operation flow between the components, or to and from other components of the apparatus of FIG. 1, such as storage devices.

It will be appreciated by a person skilled in the art that the disclosed apparatus is exemplary only and that multiple other implementations can be designed without deviating from the disclosure. It will be further appreciated that components of the apparatus can be implemented using proprietary or commercial products.

The disclosure relates to a method and apparatus for automatically detecting sentiments in interactions, based on text which is assumed to contain errors, such as text that is automatically retrieved from voice. The apparatus and method provide further insight into the interactions, by detecting the interactions that are more important without listening to huge amounts of vocal data.

It will be appreciated that multiple implementations and variations of the method and apparatus can be designed. Various features and relative weights thereof can be considered and used. The method and apparatus can be implemented to assign sections to interactions, context units words, or any other parts of an interaction.

While the disclosure has been described with reference to exemplary embodiments, it will be understood by those skilled in the art that various changes may be made and equivalents may be substituted for elements thereof without departing from the scope of the disclosure. In addition, many modifications may to be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for automatically detecting sentiments in an audio signal of an interaction held in a call center, comprising:
    receiving the audio signal from a logging and capturing unit associated with the call center;
    performing audio analysis on the audio signal to obtain text spoken within the interaction;
    segmenting the text into context units according to acoustic information acquired from the audio signal to identify units of speech bound by non-speech segments; wherein each context unit includes one or more words;
    extracting a sentiment candidate context unit from the context units using a phonetic based search;
    extracting linguistic features from the text of the sentiment candidate context unit and acoustic features from a segment of the audio signal associated with the sentiment candidate context unit;
    determining in accordance with the linguistic features and acoustic features whether the sentiment candidate context unit is valid or erroneous; and
    determining sentiment polarity and intensity for the sentiment candidate context unit.

2. The method of claim 1 further comprising determining a total interaction score indicating sentiment polarity and intensity of the interaction.

3. The method of claim 2 wherein determining the total interaction score is performed using an interaction sentiment model.

4. The method of claim 3 further comprising a training step for generating the interaction sentiment model.

5. The method of claim 4 wherein the training step comprises:
    receiving a training interaction;
    performing audio analysis on the training interaction for obtaining;
    segmenting the text into context units;
    determining sentiment context units from the context units;
    extracting features related to the interaction;
    receiving tagging data related to the interaction; and
    generating the interaction sentiment model using the features and the tagging data.

6. The method of claim 1 wherein the audio analysis comprises activating at least one engine selected from the group consisting of: a speech to text engine; a word spotting engine; an emotion detection engine; and a talkover engine.

7. The method of claim 1 wherein determining whether the candidate context unit is valid or erroneous is performed using a validity model.

8. The method of claim 5 further comprising a training step for generating the validity model.

9. The method of claim 8 wherein the training step comprises:
    receiving a training interaction;
    performing audio analysis on the training interaction for obtaining text;
    segmenting the text into context units;
    extracting a training sentiment candidate context unit from the context units;
    extracting features from the training sentiment candidate context unit or from the audio signal;
    receiving tagging data for the training sentiment candidate context unit; and
    generating a model using the training sentiment candidate context unit and the tagging data.

10. The method of claim 1 wherein determining the sentiment polarity and intensity is performed using a sentiment polarity and intensity model.

11. The method of claim 10 further comprising a training step for generating the polarity or intensity model.

12. The method of claim 11 wherein the training step comprises:
    receiving a training interaction;
    performing audio analysis on the training interaction for obtaining text;
    segmenting the text into context units;
    extracting a training sentiment candidate context unit from the context units;
    extracting features from the training sentiment candidate context unit and from the audio signal;
    receiving tagging data for the training sentiment candidate context unit; and
    generating the polarity or intensity model using the training sentiment candidate context unit and the tagging data.

13. The method of claim 1 wherein the feature is selected from the group consisting of: a term in the sentiment candidate context unit; a feature associated with the term; number of adjectives in the sentiment candidate context unit; number of adverbs in the sentiment candidate context unit; whether the sentiment candidate context unit contains a modal or a pronoun; speech rate in the sentiment candidate context unit; silence average duration in the sentiment candidate context unit; duration of the sentiment candidate context unit; main speaker in the sentiment candidate context unit; number of positive or negative dictionary terms in the sentiment candidate context unit; whether the term is an exact match with a dictionary term or not; a score indicating a level of match between the term and the dictionary term; score based on terms found in the sentiment candidate context unit; interaction duration; repetitions within the interaction of a term related to a word in the sentiment candidate context unit; part of speech of a word within the sentiment candidate context unit; a score obtained from a second audio analysis engine operated on the interaction or part thereof; a feature of a context unit neighboring the sentiment candidate context unit; a position of a context unit; and a relative position of a context unit.

14. The method of claim 1 further comprising a step of further analysis, selected from the group consisting of: topic extraction, link analysis, and root cause analysis.

15. An apparatus for automatically detecting sentiments in an audio signal of an interaction held in a call center, comprising:
an interaction receiving component arranged to receive an audio signal representing the interaction;
an extraction component for obtaining text spoken within the interaction;
a context unit segmentation component arranged to segment the audio signal into context units according to acoustic information acquired from the audio signal to identify units of speech bound by non-speech segments; wherein each context unit includes one or more words;
a sentiment candidate identification component for identifying a sentiment candidate from the context units using a phonetic based search;
a feature extraction component arranged to extract linguistic features from the text of the sentiment candidates and acoustic features from a segment of the audio signal associated with the sentiment candidates; and
a classification component arranged to apply a model to the linguistic features and acoustic features to determine whether the audio signal contains sentiment, or sentiment polarity and intensity of the sentiment within the audio signal.

16. The apparatus of claim 15 further comprising a natural language processing component arranged to perform linguistic analysis on text extracted by the extraction component.

17. The apparatus of claim 15 wherein the extraction component comprises at least one engine selected from the group consisting of: a speech to text engine, a word spotting engine; an emotion detection engine; and a talkover engine.

18. The apparatus of claim 15 further comprising a model training component arranged to train the model.

19. The apparatus of claim 15 wherein the feature extraction component is arranged to extract at least one feature selected from the group consisting of: a term; a feature associated with the term; number of adjectives in a context unit; number of adverbs in a context unit; whether the context unit contains a modal or a pronoun; speech rate in context unit; silence average duration in the context unit; duration of the context unit; main speaker in the context unit; number of positive or negative dictionary terms in the context unit; whether the term is an exact match with a dictionary term or not; a score indicating a level of match between the term and the dictionary term; score based on terms found in the context unit; interaction duration; repetitions within the interaction of a term related to a word in the context unit; part of speech of a word within the context unit; a score obtained from a second audio analysis engine operated on the interaction or part thereof; a feature of a second context unit neighboring the context unit; a position of a context unit; and a relative position of a context unit.

20. A non-transitory computer readable storage medium containing a set of instructions for a general purpose computer, the set of instructions comprising instructions to perform the method of claim 1.

* * * * *